(12) United States Patent
Borsari et al.

(10) Patent No.: US 8,707,662 B2
(45) Date of Patent: Apr. 29, 2014

(54) PACKAGING MACHINE

(75) Inventors: Roberto Borsari, Modena (IT); Stefano Costa, Casalmaggiore (IT); Claudio Ferrari, Fiorano Modenese (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 441 days.

(21) Appl. No.: 12/988,229

(22) PCT Filed: May 20, 2009

(86) PCT No.: PCT/EP2009/056195
§ 371 (c)(1),
(2), (4) Date: Oct. 15, 2010

(87) PCT Pub. No.: WO2009/144168
PCT Pub. Date: Dec. 3, 2009

(65) Prior Publication Data
US 2011/0036062 A1    Feb. 17, 2011

(30) Foreign Application Priority Data
May 28, 2008   (EP) .................................. 08157129

(51) Int. Cl.
*B65B 9/06*    (2012.01)
*B31F 1/10*    (2006.01)

(52) U.S. Cl.
USPC ............. 53/550; 493/196; 493/257; 493/258; 493/302; 493/416

(58) Field of Classification Search
USPC ............. 53/550; 269/289 MR; 493/196, 254, 493/258, 257, 302, 416
See application file for complete search history.

(56) References Cited

U.S. PATENT DOCUMENTS

| | | | |
|---|---|---|---|
| 2,607,696 A * | 8/1952 | Kunz | 426/413 |
| 3,505,779 A * | 4/1970 | Kopp | 53/550 |
| 3,681,173 A * | 8/1972 | Jones | 156/555 |

(Continued)

FOREIGN PATENT DOCUMENTS

| | | |
|---|---|---|
| DE | 17 04 107 A1 | 4/1971 |
| EP | 1 826 124 A1 | 8/2007 |

(Continued)

OTHER PUBLICATIONS

International Search Report (PCT/ISA/210) issued on Sep. 1, 2009, by EuropeanPatent Office as the International Searching Authority for International Application No. PCT/EP2009/056195.

(Continued)

*Primary Examiner* — Hemant M Desai
*Assistant Examiner* — Gloria R Weeks
(74) *Attorney, Agent, or Firm* — Buchanan Ingersoll & Rooney PC (57) ABSTRACT

A packaging machine for producing sealed packages from a web of packaging material having a surface of uneven thickness comprises a pressure roller to press the surface against a corresponding forming roller for sealing the package. The pressure roller comprises an elastically deformable body; and a core of greater rigidity housed therein, with the core comprising a first end surface cooperating with the body, and a radially inner second end surface. The core includes a first portion and a second portion, with the radial distance between the first and second surface at the first portion being greater than at the second portion.

18 Claims, 6 Drawing Sheets

(56) References Cited

U.S. PATENT DOCUMENTS

| | | | |
|---|---|---|---|
| 4,158,128 A * | 6/1979 | Evdokimov et al. | 219/469 |
| 4,690,668 A * | 9/1987 | Rebmann et al. | 493/297 |
| 4,807,426 A * | 2/1989 | Smith | 53/550 |
| 4,834,822 A * | 5/1989 | Ueberegger | 156/203 |
| 5,067,311 A * | 11/1991 | Andersson | 53/551 |
| 5,089,201 A * | 2/1992 | Takahashi | 264/135 |
| 5,195,430 A * | 3/1993 | Rise | 100/168 |
| 5,257,965 A * | 11/1993 | Fuchs et al. | 492/6 |
| 5,538,677 A * | 7/1996 | Takahashi | 264/221 |
| 5,767,491 A * | 6/1998 | Ohlsson et al. | 219/633 |
| 5,813,964 A * | 9/1998 | Motomura | 493/302 |
| 6,052,970 A * | 4/2000 | Fujimoto et al. | 53/451 |
| 6,397,557 B1 * | 6/2002 | Bassissi et al. | 53/51 |
| 6,440,347 B1 * | 8/2002 | Izawa et al. | 264/262 |
| 6,973,951 B2 * | 12/2005 | Henegar | 156/499 |
| 7,107,681 B2 * | 9/2006 | Yura et al. | 29/895.3 |
| 7,827,768 B2 * | 11/2010 | Rosberg et al. | 53/452 |
| 2004/0011459 A1 | 1/2004 | Henegar | |
| 2005/0016124 A1 * | 1/2005 | Kinoshita et al. | 53/64 |
| 2008/0092491 A1 | 4/2008 | Kinoshita | |

FOREIGN PATENT DOCUMENTS

| | | |
|---|---|---|
| JP | 4-132937 U | 12/1992 |
| JP | 10-101012 A | 4/1998 |
| JP | 2004-330453 A | 11/2004 |
| JP | 2008-137702 A | 6/2008 |

OTHER PUBLICATIONS

Written Opinion (PCT/ISA/237) issued on Sep. 1, 2009, by European Patent Office as the International Searching Authority for International Application No. PCT/EP2009/056195.

Japanese Office Action issued Apr. 19, 2013 by the Japanese Patent Office in Japanese Patent Application No. 2011-510954 and English language translation of the Japanese Office Action (5 pgs).

* cited by examiner

PACKAGING MACHINE

TECHNICAL FIELD

The present invention relates to a packaging machine for producing sealed packages of a food product from a web of packaging material; more specifically, the present invention relates to a packaging machine incorporating an innovative pressure roller to be used during a forming and sealing stage of the above-mentioned packages.

BACKGROUND ART

As it is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging machines, on which the tube is formed continuously from the web-fed packaging material. More specifically, the web of packaging material is unwound off a reel and fed through a station for applying a sealing strip of heat-seal plastic material, and through an aseptic chamber on the packaging machine, where it is sterilized, e.g. by applying a sterilizing agent such as hydrogen peroxide, which is subsequently evaporated by heating, and/or by subjecting the packaging material to radiation of appropriate wavelength and intensity.

The web of packaging material is then fed through an aseptic chamber, where it is maintained in a sterile-air environment, and through a number of forming assemblies which interact with the packaging material to fold it gradually from strip form into a tube shape.

More specifically, a first portion of the sealing strip is applied to a first longitudinal edge of the packaging material, on the face of the material eventually forming the inside of the packages; and a second portion of the sealing strip projects from the first longitudinal edge.

The forming assemblies are arranged in succession, and comprise respective roller folding members defining a number of compulsory packaging material passages varying gradually in section from a C shape to a substantially circular shape.

On interacting with the folding members, the second longitudinal edge is laid on the outside of the first longitudinal edge with respect to the axis of the tube being formed. More specifically, the sealing strip is located entirely inside the tube, and the face of the second longitudinal edge facing the axis of the tube is superimposed partly on the second portion of the sealing strip, and partly on the face of the first longitudinal edge located on the opposite side to the first portion of the sealing strip.

Packaging machines of the above type are known in which the first and second longitudinal edge are heat sealed to form a longitudinal seal along the tube, which is then filled with the sterilized or pasteurized food product, and is sealed and cut along equally spaced cross sections to form pillow packs, which are then folded mechanically to form respective parallelepiped-shaped packages.

More specifically, the heat-seal operation comprises a first heating step to heat the second longitudinal edge without the sealing strip; and a second pressure step to compress the sealing strip and the longitudinal edges.

The first heating step melts the polyethylene layer of the second longitudinal edge, which transmits heat by conduction to the first longitudinal edge and the sealing strip, so as to melt the polyethylene layer of the first longitudinal edge and the heat-seal material of the sealing strip.

At the second pressure step, the tube is fed between a number of first rollers outside the tube, and at least one second roller inside the tube.

More specifically, the first rollers define a compulsory circular passage for the tube of packaging material, and have respective axes in a plane perpendicular to the path of the tube.

The second roller has an axis parallel to the axis of a corresponding first roller, and presses the sealing strip and the longitudinal edges of the packaging material against the corresponding first roller, so that the heat-seal material of the sealing strip and the polyethylene layers of the longitudinal edges blend completely and form the molecular bonds defining the longitudinal seal of the tube.

More specifically, the second roller cooperates with a surface of uneven thickness, that is, defining a step along the centreline of the sealing strip. The second portion of the sealing strip, in fact, is superimposed directly on the inner face of the second longitudinal edge, whereas the first longitudinal edge is interposed between the inner face of the second longitudinal edge and the first portion of the sealing strip, so the first portion is closer to the axis of the pressure roller than the second portion.

Because of this difference in thickness, highly uneven pressure is exerted on the sealing strip. More specifically, pressure is maximum at the step, and is greater on the first portion than the second portion of the sealing strip.

The danger therefore exists of the pressure on the second portion of the sealing strip not being sufficient to seal the second portion completely to the face of the second longitudinal edge inside the tube, thus resulting in a discontinuous longitudinal seal.

A need is felt within the industry for a packaging machine provided with pressure rollers capable of exerting sufficient pressure on the whole sealing strip to ensure complete blending of the polyethylene, and thereby prevent the formation of a discontinuous longitudinal seal.

It is an object of the present invention to provide a packaging machine designed to achieve the above in a straightforward, low-cost manner.

DISCLOSURE OF THE INVENTION

According to the present invention, there is provided a packaging machine for producing sealed packages of a food product from a web of packaging material, as claimed in claim 1.

BRIEF DESCRIPTION OF THE DRAWINGS

Several preferred, non-limiting embodiments of the present invention will be described by way of example with reference to the accompanying drawings, in which.

BEST MODE FOR CARRYING OUT THE INVENTION

Figure 1:
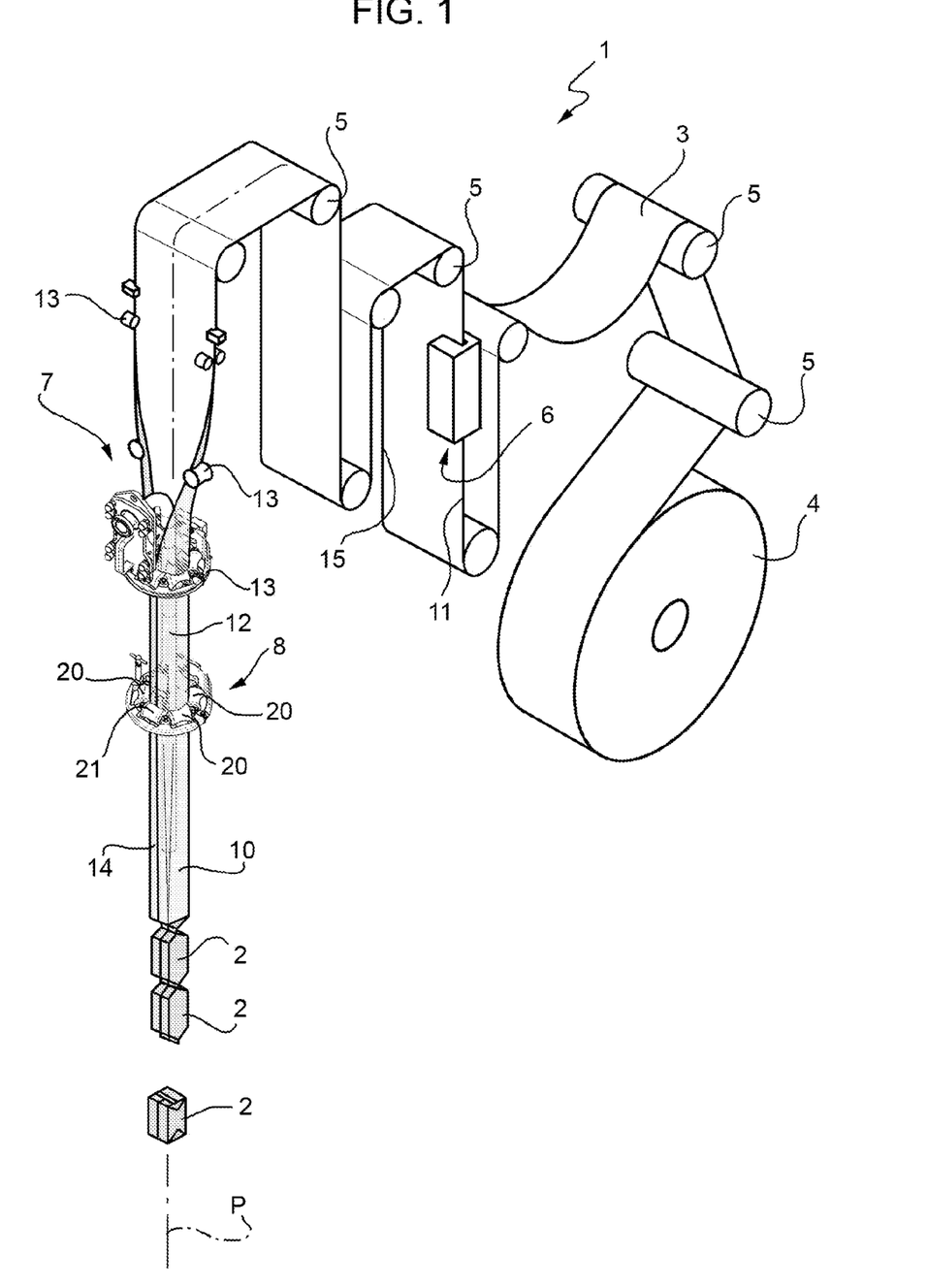
FIG. 1 shows a schematic view in perspective of a pourable food product packaging machine in accordance with the present invention.

Number 1 in FIG. 1 indicates as a whole a packaging machine for continuously producing sealed packages 2 of a food product from a web 3 of packaging material, which is unwound off a reel 4 and fed along a forming path P.

Machine 1 preferably produces sealed packages 2 of a pourable food product, such as pasteurized or UHT milk, fruit juice, wine, peas, beans, etc.

Machine 1 may also produce sealed packages 2 of a food product that is pourable when producing packages 2, and sets after packages 2 are sealed. One example of such a food product is a portion of cheese, that is melted when producing packages 2, and sets after packages 2 are sealed.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

More specifically, web 3 is fed along path P by guide members 5, e.g. rollers or similar, and successively through a number of work stations, of which are shown schematically: a station 6 for applying a sealing strip 9 (shown enlarged in thickness in FIG. 5 for the sake of clarity) to web 3; a forming station 7 for forming a tube 10 of packaging material; and a station 8 for heat sealing a longitudinal seal 14 along tube 10.

Machine 1 also comprises a fill device 12 for pouring the sterilized or sterile-processed food product continuously into tube 10 of packaging material; and a jaw-type forming assembly (not shown) for gripping, sealing, and cutting tube 10 along equally spaced cross sections to form a succession of packages 2.

More specifically, at station 6, a longitudinal edge 11, parallel to path P, of web 3 is first heated, e.g. by air or induction, to melt the plastic layer. Web 3 has a longitudinal edge 15 opposite edge 11 and also parallel to path P.

Next, a portion 16 (FIG. 5) of strip 9 is first applied to the face of edge 11 eventually facing inwards of packages 2, while a further portion 17 of strip 9 projects from edge 11.

Finally, strip 9 is pressed onto longitudinal edge 11, e.g. by means of rollers not shown.

More specifically, sealing strip 9 is made of heat-seal plastic material.

Strip 9 prevents edge 11 from absorbing the food product once tube 10 and seal 14 of the tube are formed, and also provides for improving the gas-barrier performance and physical strength of seal 14.

Figure 2:
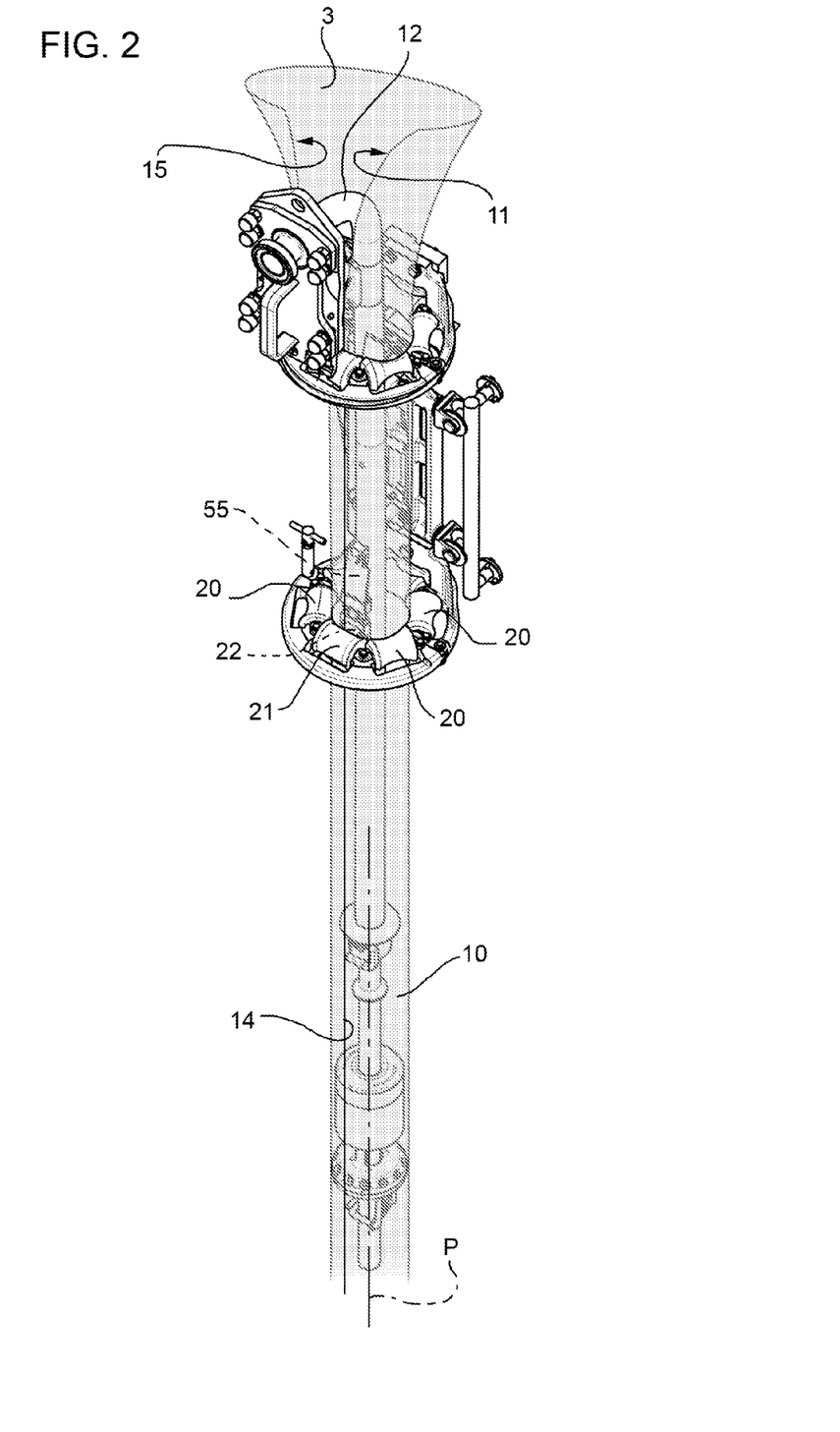
FIG. 2 shows a larger-scale view of a number of operating stations of the FIG. 1 machine.

Station 7 comprises a number of forming assemblies 13 arranged successively along path P, and which interact gradually with web 3 to fold it into the form of tube 10.

More specifically, forming assemblies 13 comprise respective numbers of rollers defining respective compulsory packaging material passages, the respective sections of which vary gradually from a C shape to a substantially circular shape.

More specifically, the axes of the rollers in each forming assembly 13 lie in a relative plane perpendicular to path P.

Figure 5:
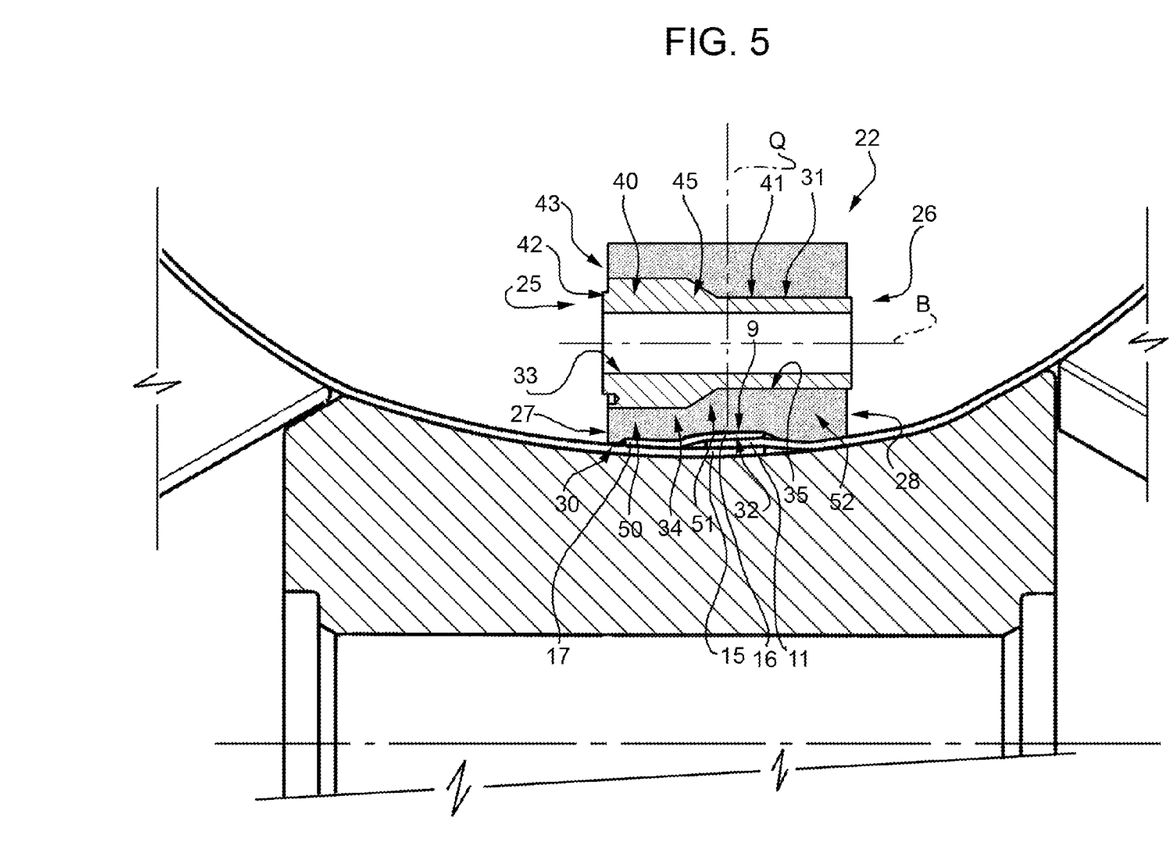
FIG. 5 shows a much larger-scale section, with parts removed for clarity, along line V-V in FIG. 4.

As shown in FIG. 5, forming assemblies 13 gradually form tube 10, so that edge 15 is located outwards of edge 11 with respect to the axis of tube 10. More specifically, when forming tube 10, strip 9 is located inside tube 10, and the inner face of edge 15 is superimposed partly on portion 17 of strip 9, and partly on the outer face of edge 11.

Station 8 comprises heating means (not shown) for heating edge 15 and locally melting the polyethylene layer of edge 15. Heat is transmitted by conduction from edge 15 to edge 11 and strip 9, so as to locally melt the polyethylene layer of edge 11 and the heat-seal material of strip 9.

Figure 3:
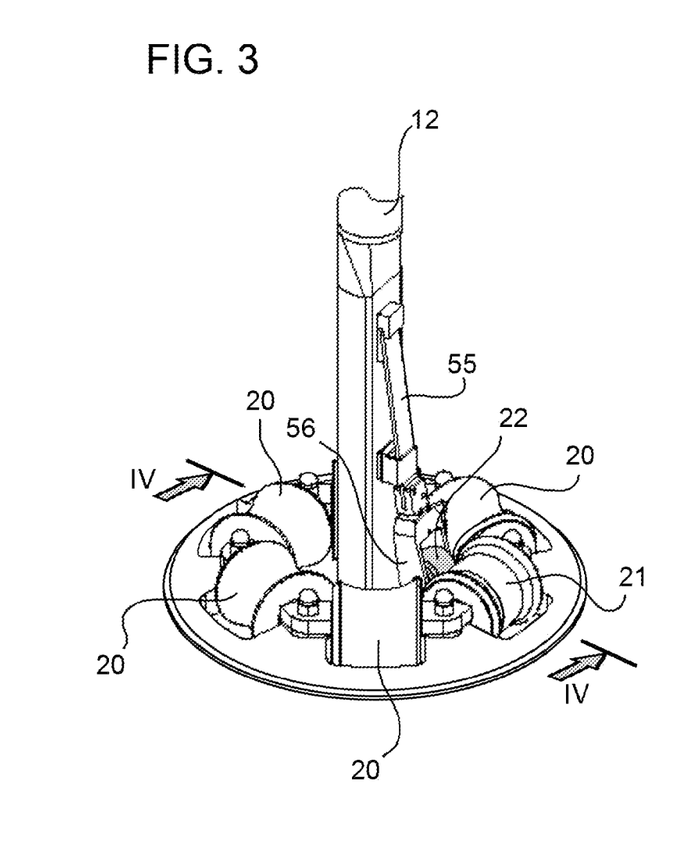
FIG. 3 shows a view in perspective of a station of the FIGS. 1 and 2 machine comprising a pressure roller in accordance with the invention.

Station 8 also comprises a number of forming rollers 20, 21 defining a compulsory circular passage for tube 10; and at least one roller 22 for pressing portion 17 of strip 9, and portion 16 of strip 9 and edge 11 onto the face of edge 15 inside tube 10, so the polyethylene layers of edges 11, 15 and the heat-seal material of strip 9 blend completely to form the molecular bonds defining seal 14 of tube 10.

More specifically, rollers 20, 21 are located outside tube 10, and pressure roller 22 inside tube 10.

With reference to FIG. 3, rollers 20, 21 are idle rollers, and have respective axes A (only only one shown in FIGS. 4 and 5) in a plane perpendicular to path P. The circular passage defined by rollers 20, 21 has a diameter equal to the final diameter of the longitudinally sealed tube 10.

Each roller 20, 21 is of minimum diameter in a respective central plane perpendicular to respective axis A, and decreases in diameter from its axial ends towards said central plane.

Pressure roller 22 is mounted idly, is positioned facing a corresponding roller 21, and has an axis B parallel to axis A of corresponding roller 21.

More specifically, pressure roller 22 is smaller in length and diameter than corresponding roller 21.

Pressure roller 22 (FIG. 6) substantially comprises a body 30, and a core 31 housed coaxially inside body 30.

Figure 6:
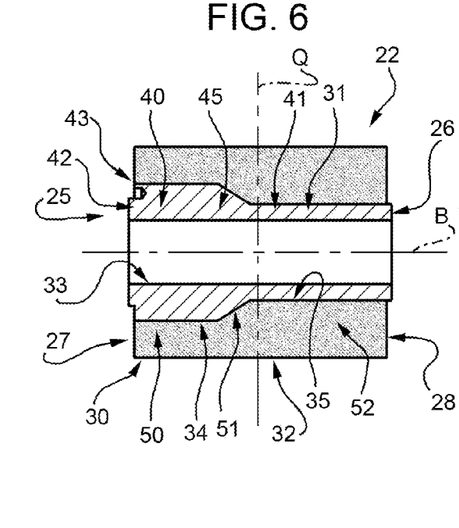
FIG. 6 shows a longitudinal section of the FIGS. 3 and 5 pressure roller.

More specifically, body 30 is made of elastically deformable material, e.g. rubber.

Core 31 is made of more rigid material than body 30, e.g. a plastic polymer material, and is preferably made of polyetheretherketone, i.e. a polymer known commercially as "PEEK".

Body 30 and core 31 define an outer radial end surface 32 and an inner radial end surface 33 respectively of pressure roller 22.

Body 30 is bounded radially inwards by a surface 35 opposite surface 32; and core 31 is bounded radially outwards by a surface 34 opposite surface 33 and cooperating with surface 35.

Surfaces 32, 33 preferably extend at a constant radial distance from axis B, so that pressure roller 22 is in the form of a hollow cylinder.

Core 31 advantageously comprises a portion 40 and a portion 41, and the radial distance between surfaces 33 and 34 at portion 40 is greater than the radial distance between surfaces 33 and 34 at portion 41, i.e. portion 40 is radially thicker than portion 41.

Portion 40 is located entirely on one side of a central plane Q perpendicular to axis B of pressure roller 22, whereas portion 41 is intersected by plane Q.

Portions 40, 41 are cylindrical.

Core 31 comprises two opposite axial ends 25, 26 interposed radially between surfaces 33, 34.

More specifically (FIG. 6), core 31 comprises, from end 25 to end 26:

a cylindrical portion 42 and a shoulder 43;
portion 40;
a portion 45, in which the radial distance between surfaces 33 and 34 decreases; and
portion 41.

More specifically, surface 34 comprises a truncated-cone-shaped portion defining radially outer portion 45.

Figure 6A:
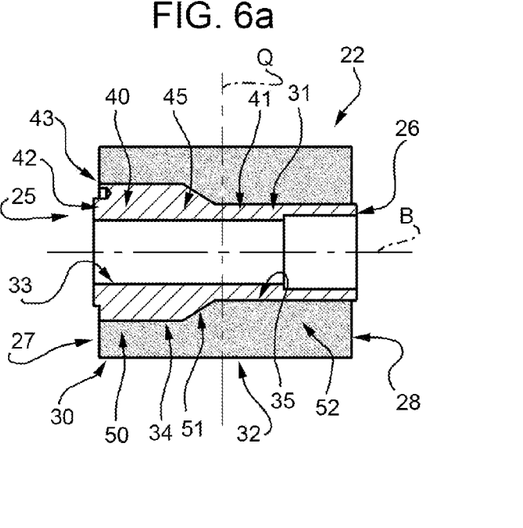
FIG. 6A shows a longitudinal section of an alternative embodiment of the pressure roller of FIG. 6.

From end 25 to end 26, the truncated-cone-shaped portion of surface 34 converges with respect to axis B. As an alternative (illustrated in FIG. 6A), surface 33 may extend at a greater radial distance from axis B at end 26 than over the rest of core 31, which advantageously enables defining univocally the mounting direction for pressure roller 21 on packaging machine 1.

Body 30 comprises two opposite ends 27, 28 extending radially between surfaces 32 and 35. More specifically, ends 25, 26 of core 31 project axially from respective ends 27, 28 of body 30.

From end 27 to end 28, body 30 comprises a number of portions 50, 51, 52 surrounding respective portions 40, 45, 41 of core 31.

More specifically, portions 50 and 52 are cylindrical, and the radial thickness of portion 50, i.e. the radial distance between surfaces 32 and 35, is smaller than the radial thickness of portion 52.

From end 27 to end 28, the radial thickness of portion 51 increases.

Portions 50, 52 of body 30 cooperate respectively with portions 17, 16 of strip 9 (FIG. 5).

Because portion 17 is superimposed directly on the face of edge 15 inside tube 10, whereas portion 16 is applied to edge 11 in turn superimposed on the inner face of edge 15, pressure roller 22 presses against roller 21 a surface of sharply uneven thickness, i.e. defining a step, which, in the example shown, is located along a longitudinal centreline of the sealing strip. More specifically, the uneven surface is thicker at portion 16 of strip 9, and thinner at portion 17 of strip 9.

Consequently, portion 50 (shown deformed in FIG. 5) of body 30 cooperates with a surface thinner than that with which portion 52 of body 30 cooperates.

Figure 4:
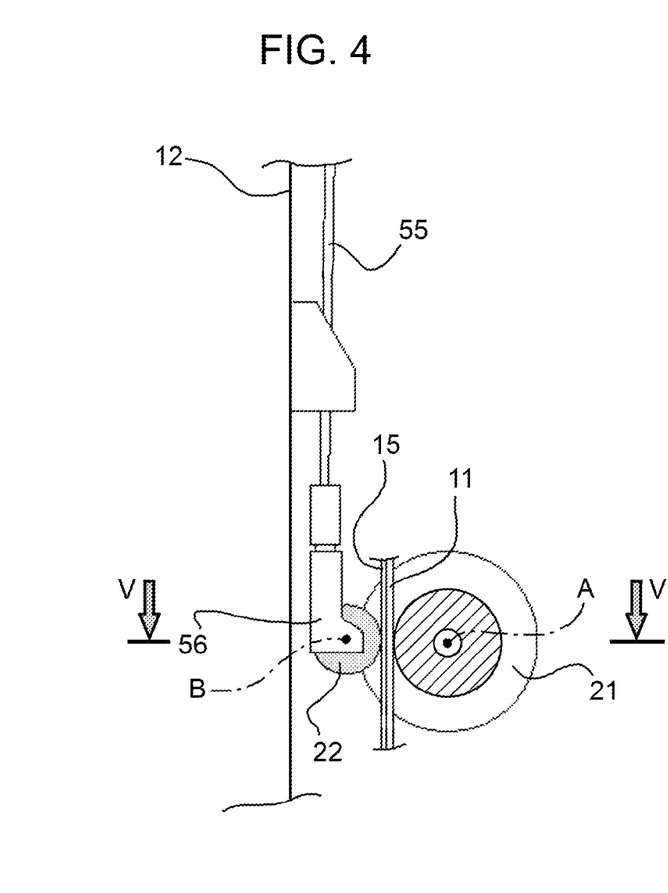
FIG. 4 shows a section, with parts removed for clarity, along line IV-IV in FIG. 3.

As shown in FIGS. 3 and 4, pressure roller 22 is pushed against corresponding roller 21 by elastic means. More specifically, the elastic means comprise a leaf spring 55 having a first end fixed to device 12, and a second end, opposite the first end, fixed to a supporting device 56 about which pressure roller 22 rotates about axis B.

In actual use, web 3 us unwound off reel 4 and fed along path P.

More specifically, web 3 is fed by guide members 5 along path P and through successive stations 6, 7, 8.

At station 6, edge 11 is heated, and portion 16 of strip 9 is applied to the face of edge 11 eventually facing inwards of packages 2. Once portion 16 is applied to edge 11, portion 17 projects from edge 11.

Next, web 3 interacts gradually with forming assemblies 13, and is folded to superimpose edges 11, 15 and form tube 10 not yet sealed longitudinally.

More specifically, forming assemblies 13 fold web 3 (FIG. 5) so that strip 9 is located inside the as yet unsealed tube 10, edge 15 is located radially outwards of edge 11 and portion 17 with respect to the axis of tube 10 still to be sealed longitudinally, and edge 11 is located radially outwards of portion 16 of strip 9 (FIG. 5).

At station 8, edge 15 is heated to melt the polyethylene layer, and heat is transmitted by conduction from edge 15 to edge 11 and strip 9 to melt the polyethylene layer of edge 11 and the heat-seal material of strip 9.

Next, tube 10 is fed through the circular passage defined by rollers 20, 21. Edges 11, 15 and strip 9 are compressed between rollers 21, 22 to blend the polyethylene layer of edges 11, 15 and the heat-seal material of strip 9, and so form the molecular bonds defining seal 14 of the finished tube 10.

More specifically, seal 14 is formed by sealing to the inner face of edge 15 portion 17 of strip 9 and the face of edge 11 on the opposite side to portion 16.

When forming seal 14, portion 50 of body 30 presses portion 17 of strip 9 onto the inner face of edge 15, while portion 52 of body 30 presses portion 16 and edge 11 onto the inner face of edge 15.

Portions 50, 52 of body 30 therefore cooperate with respective portions of different thickness of the same surface having a step, in the example shown, along the centreline of strip 9. More specifically, portion 52 compresses a portion of said surface thicker than the portion compressed by portion 50.

The longitudinally sealed tube 10 is filled continuously with the pourable food product by device 12, and is then fed through the jaw-type forming assembly (not shown) where it is gripped, sealed, and cut along equally spaced cross sections to form a succession of packages 2.

Figures 7, 8:
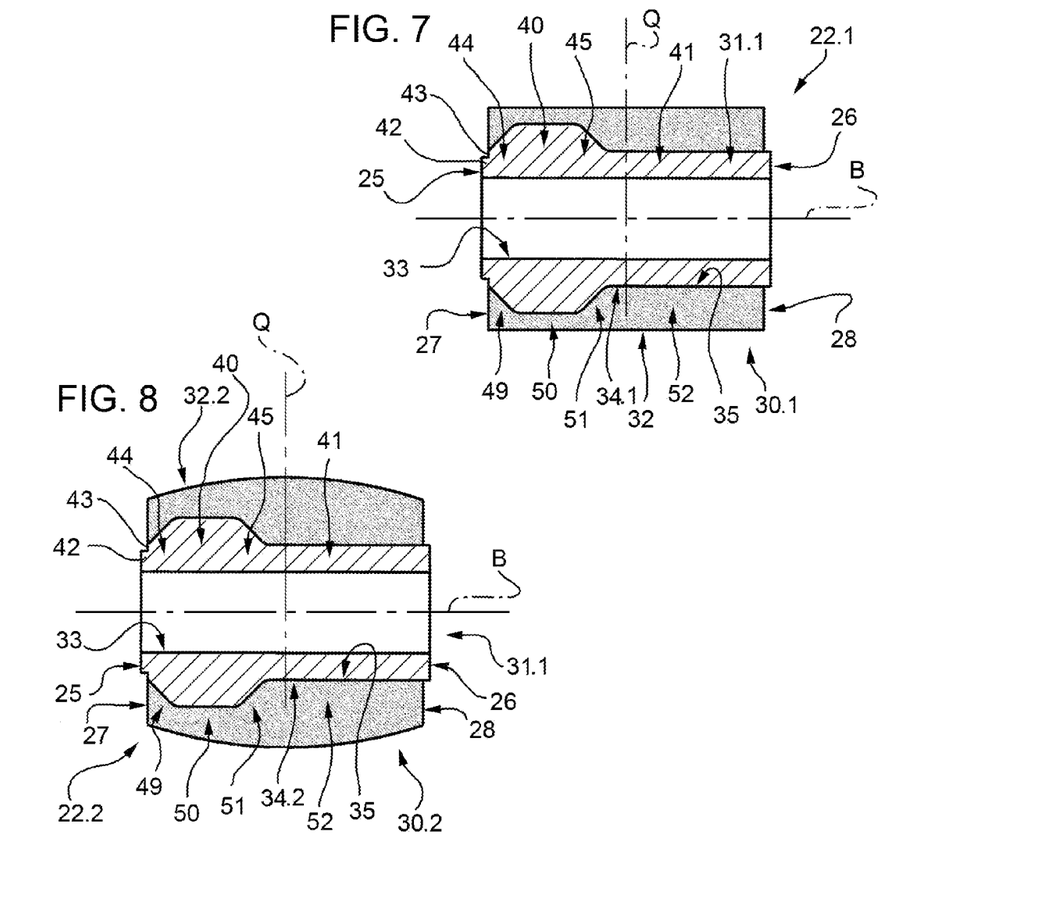
FIGS. 7-9 show respective longitudinal sections of a second, third and fourth embodiment of the FIGS. 3 and 5 pressure roller.

Number 22.1 in FIG. 7 indicates as a whole a different embodiment of the pressure roller incorporated in packaging machine 1 in accordance with the present invention.

Pressure roller 22.1 is similar to pressure roller 22, and is described below only insofar as it differs from the latter, and using the same reference numbers, where possible, for identical or corresponding parts of pressure rollers 22, 22.1.

More specifically, pressure roller 22.1 differs from pressure roller 22 in that core 31.1 comprises an end portion 44 in which, from end 25, the radial distance between surfaces 33 and 35 increases, with respect to axis B. Also, surface 34.1 comprises a truncated-cone-shaped portion defining radially outer end portion 44.

Accordingly, from end 25 to end 26, the truncated-cone-shaped portion of surface 34.1 diverges with respect to axis B.

Further, body 30.1 comprises an end portion 49 surrounding end portion 44 of core 31.1. From end 27, the radial thickness of end portion 49 increases, with respect to axis B.

Advantageously, end portion 49 of body 30.1 surrounding end portion 44 of core 31.1 enables a better grasping of core 31.1 by body 30.1, thereby favouring, in use, a greater reciprocal stability between cooperating surfaces 34.1 and 35 and, consequently, a longer lifetime.

Number 22.2 in FIG. 8 indicates as a whole a further embodiment of the pressure roller incorporated in packaging machine 1 in accordance with the present invention. Pressure roller 22.2 is similar to pressure rollers 22, 22.1, and is described below only insofar as it differs from them, and using the same reference numbers, where possible, for identical or corresponding parts of pressure rollers 22, 22.1, 22.2.

More specifically, pressure roller 22.2 differs from pressure roller 22.1 by being hollow-barrel-shaped, i.e. surface 32.2 extends at increasing radial distances with respect to axis B from end 27 to plane Q, and at decreasing radial distances with respect to axis B from plane Q to end 28.

Advantageously, pressure roller 22.2 enables the pressure exerted by surface 32.2 to be distributed in any predetermined manner by appropriately varying the radial dimensions of core 31.1 and body 30.2. The hollow-barrel-shape of body 30.2 makes pressure roller 22.2 particularly advantageous when incorporated in a packaging machine intended for small-diameter tubes 10.

Figures 9, 10, 11:
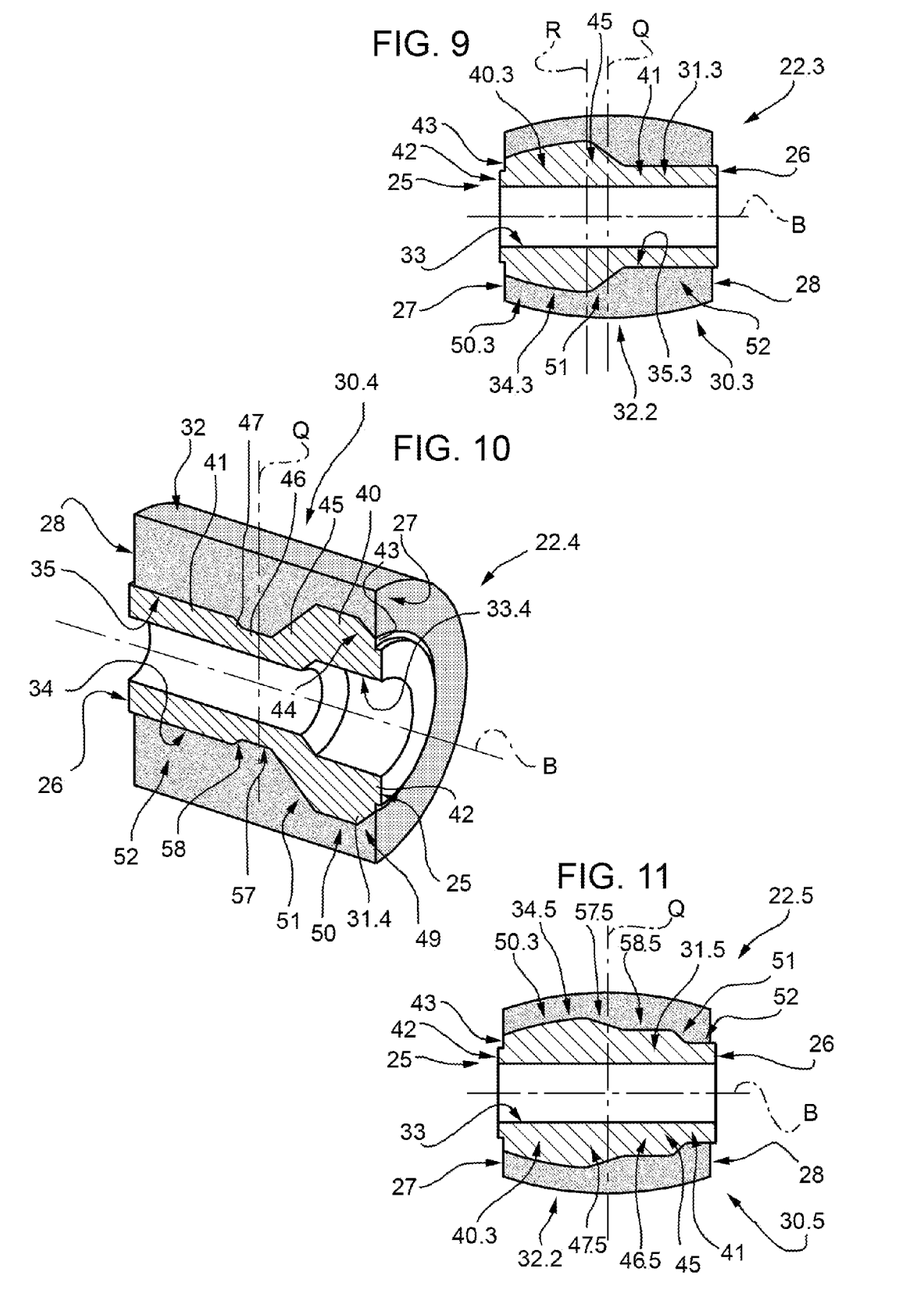
FIG. 10 shows a view in perspective, with parts removed for clarity, of a fifth embodiment of the FIGS. 3 and 5 pressure roller.
FIG. 11 shows a longitudinal section of a sixth embodiment of the FIGS. 3 and 5 pressure roller.

Number 22.3 in FIG. 9 indicates as a whole a further embodiment of the pressure roller incorporated in packaging machine 1 in accordance with the present invention. Pressure roller 22.3 is similar to pressure rollers 22, 22.1, and 22.2 and is described below only insofar as it differs from them, and using the same reference numbers, where possible, for identical or corresponding parts of pressure rollers 22, 22.1, 22.2.

Pressure roller 22.3 specifically differs from pressure roller 22.2 by core 31.3 comprising a barrel-shape portion 40.3, i.e. in which the radial distance between surfaces 33 and 35.3 increases, with respect to axis B, from end 25 to a plane R parallel to, and spaced apart from, plane Q; in particular, the radial distance between surfaces 33 and 35.3 increases proportionally to the distance between surface 32.2 and surface 33. Therefore, the thickness of portion 50.3 of body 30.3, which surrounds portion 40.3 of core 31.3, is constant between end 27 and plane R. In other words, the radial distance between surface 34.3 and surface 32.2 is constant from end 25 to plane R.

Advantageously, the packaging machine according to the invention comprising pressure roller 22.3 enables the pressure exerted by surface 32.2 to be distributed particularly homogeneously in view of a homogeneously distributed deformation of portion 50.3 of body 30.3.

Number 22.4 in FIG. 10 indicates as a whole a further embodiment of the pressure roller incorporated in packaging machine 1 in accordance with the present invention. Pressure roller 22.4 is similar to the pressure rollers described above and is described below only insofar as it differs from them, and using the same reference numbers, where possible, for identical or corresponding parts of all pressure rollers described thus far.

Pressure roller 22.4 differs from roller 22.1 by core 31.4 comprising a cylindrical portion 46 interposed axially between portions 41 and 45; and a portion 47 increasing in thickness from end 25 to end 26. More specifically, portion 47 is interposed axially between portion 46 and portion 41.

Body 30.4 differs from body 30.1 by comprising two portions 57, 58 surrounding respective portions 46, 47.

Finally, surface 33.4 differs from surface 33.1 by extending at a greater radial distance from axis B at end 25 than at end 26.

Number 22.5 in FIG. 11 indicates as a whole a further embodiment of the pressure roller incorporated in packaging machine 1 in accordance with the present invention. Pressure roller 22.5 is similar to the pressure rollers described above and is described below only insofar as it differs from them, and using the same reference numbers, where possible, for identical or corresponding parts of all pressure rollers described thus far.

Pressure roller 22.5 differs from roller 22.3 by core 31.5 comprising a cylindrical portion 46.5 interposed axially between portions 41 and 40.3; and a portion 47.5 decreasing in thickness from end 25 to end 26. More specifically, portion 47.5 is interposed axially between portion 46.5 and portion 41.

Body 30.5 differs from body 30.3 by comprising two portions 57.5, 58.5 surrounding respective portions 46.5, 47.5.

A packaging machine in accordance with the invention which incorporates pressure roller 22.5 is particularly suitable for small-diameter tubes 10 having a two-stepped surface to be compressed, i.e. having three different portions extending at three different radial distances from axis B.

The advantages of a packaging machine according to the present invention incorporating any of the pressure rollers described above will be clear from the above description.

In particular, core 31, 31.1, 31.3, 31.4, 31.5 made of rigid material is radially thicker at portion 40 than at portion 41, and body 30 of elastically deformable material is radially thicker at portion 52 than at portion 50.

In other words, the rigidity, radially with respect to axis B, of the portion of roller 22, 22.1, 22.2, 22.3, 22.4, 22.5 comprising portions 40 and 50 is predominantly determined by the rigidity of portion 40 of core 31, 31.1, 31.3, 31.4, 31.5 of rigid material. Similarly, the rigidity, radially with respect to axis B, of the portion of roller 22, 22.1, 22.2, 22.3, 22.4, 22.5 comprising portions 41 and 52 is predominantly determined by the rigidity of portion 52 of body 30, 30.2 of elastically deformable material.

The portion of roller 22, 22.1, 22.2, 22.3, 22.4, 22.5 comprising portions 40 and 50 is therefore of greater rigidity, radially with respect to axis B, than the portion of roller 22, 22.1, 22.2, 22.3, 22.4, 22.5 comprising portions 41 and 52.

Consequently, the portion of surface 32 cooperating with portion 17 of strip 9 deforms, radially with respect to axis B, to a lesser extent than the portion of surface 32 cooperating with portion 16 of strip 9.

The Applicant has observed that, because of this, the pressure exerted on strip 9 is maximum at the step coinciding, in the example shown, with the centreline of strip 9, and remains sufficiently high on both portions 16, 17 to ensure complete formation of seal 14.

In other words, the greater rigidity of roller 22, 22.1, 22.2, 22.3, 22.4, 22.5 at portions 40, 50 compensates for portion 16 being superimposed on both edges 11, 15, and portion 17 only being superimposed on edge 15.

Moreover, the difference in radial thickness of portions 40, 41 of core 31, 31.1, 31.3, 31.4, 31.5 enables the rigidity of the portions of pressure roller 22.1, 22.2, 22.3, 22.4, 22.5 cooperating with portions 16, 17 of the strip to be varied without altering the shape of surfaces 32, 32.2, 33, i.e. the overall external geometry of pressure roller 22, 22.1, 22.2, 22.3, 22.4, 22.5.

In other words, pressure roller 22, 22.1, 22.2, 22.3, 22.4, 22.5 enables the pressure exerted by surface 32, 32.2 to be distributed in any predetermined manner by appropriately varying the radial dimensions of core 31, 31.1, 31.3, 31.4, 31.5 and body 30, 30.1, 30.2, 30.3, 30.4, 30.5.

Pressure roller 22.1, 22.3 and 22.5 are particularly advantageous in the case of a small-diameter tube 10.

That is, surface 32.2 is designed to operate without interfering with the inner surface of tube 10, thus preventing the portions of surfaces 32.2 adjacent to ends 27, 28 from marking the inner surface of tube 10.

Finally, pressure roller 22.4 and 22.5 have a first rigidity at a first portion comprising portions 40, 50; a second rigidity at a second portion comprising portions 41, 52; and a third rigidity at a third portion comprising portions 46, 58.

Pressure roller 22.4 and 22.5 are therefore particularly advantageous for compressing a two-stepped surface, i.e. having three different portions extending at three different radial distances from axis B.

Clearly, changes may be made to a packaging machine incorporating pressure roller 22, 22.1, 22.2, 22.3, 22.4, 22.5 as described herein without, however, departing from the scope of the present invention.

In particular, a packaging machine which is to compress a sheet surface of uneven thickness may incorporate any roller which, like pressure roller 22, 22.1, 22.2, 22.3, 22.4, 22.5, has two portions extending at different radial distances from axis B.

Pressure roller 22, 22.1, 22.2, 22.3, 22.4, 22.5 may also define a laminating cylinder considerably larger in length than in diameter, and cooperating with a surface of constant thickness. In which case, the varying rigidity of pressure roller 22, 22.1, 22.2, 22.3, 22.4, 22.5 along axis B provides for compensating deformation of pressure roller 22, 22.1, 22.2, 22.3, 22.4, 22.5 and exerting even pressure on the material.

Machine 1 may also comprise two or more pressure rollers 22, 22.1, 22.2, 22.3, 22.4, 22.5.

The invention claimed is:

1. A packaging machine for producing sealed packages of a food product from a web of packaging material; said web comprising a first and a second longitudinal edge opposite each other;

said machine comprising:

forming means defining a compulsory passage for said web, and for keeping said first and second longitudinal edge superimposed to form a tube of packaging material, and being located outside said tube; said first and second longitudinal edge defining, when superimposed, a surface of uneven thickness facing inwards of said tube; and at least one pressure roller which is located inside said tube and presses said surface of uneven thickness against said forming means to form a longitudinal seal of the tube; wherein said pressure roller comprises:

a body made of elastically deformable material for pressing said sheet material; and a core made of more rigid material than said body housed inside said body and angularly integral therewith; said core comprising an outwardly facing surface cooperating with said body, and an inwardly facing surface radially inner with respect to said outwardly facing surface and surrounding a hollow portion of the core;

said core comprising at least a first portion and a second portion which each contact the body; the radial distance between said inwardly facing surface and said outwardly facing surface at said first portion being greater than at said second portion; said core comprising a first axial end face and a second axial end face positioned at opposite axial ends of the core, the first portion extending from the first axial end face toward the second portion, the second portion extending from the second axial end face toward the first portion.

2. A packaging machine as claimed in claim 1, wherein said pressure roller comprises a central plane crosswise to a central axis of the core; and in that at least one of said first and second portions extends on one side of said plane.

3. A packaging machine as claimed in claim 2, wherein said first portion of said core extends on said one side of said plane.

4. A packaging machine as claimed in claim 1, wherein said core comprises a third portion interposed axially between said first and said second portion, and at which the distance between said inwardly facing surface and said outwardly facing surface varies; said outwardly facing surface being truncated-cone-shaped at said third portion.

5. A packaging machine as claimed in claim 1, wherein said inwardly facing surface extends at a constant distance from said axis.

6. A packaging machine as claimed in claim 1, wherein said first portion and said second portion are cylindrical.

7. A packaging machine as claimed in claim 1, wherein at said first portion the distance between said inwardly facing surface and said outwardly facing surface varies; said outwardly facing surface being barrel-shaped at said first portion.

8. A packaging machine as claimed in claim 7, wherein the radial distance between said outwardly facing surface and an outer radial surface of said body is constant at said first portion.

9. A packaging machine as claimed in claim 1, wherein said core comprises a cylindrical further portion interposed axially between said first and second portion; the radial distance between said inwardly facing surface and said outwardly facing surface, measured at said further portion, differing from the radial distances between said inwardly facing surface and said outwardly facing surface, measured at said first and second portion.

10. A packaging machine as claimed in claim 9, wherein said core comprises a fourth portion interposed axially between said cylindrical further portion and said second portion, and at which the distance between said inwardly facing surface and said outwardly facing surface varies; said outwardly facing surface being truncated-cone-shaped at said fourth portion.

11. A packaging machine as claimed in claim 1, further comprising a station for applying a first portion of a sealing strip to a face of said first longitudinal edge eventually defining an inside of said packages;

said forming means and said pressure roller keeping a second portion of said sealing strip superimposed on a face of said second longitudinal edge eventually defining the inside of said packages, and keeping said first portion of said sealing strip and said first longitudinal edge superimposed on said face of said second longitudinal edge;

and in that said body of said pressure roller comprises a first body portion and a second body portion radially surrounding said first portion and said second portion of said core respectively; said first body portion of said pressure roller pressing said second portion of said sealing strip and said second longitudinal edge against said forming means; and said second body portion pressing said first portion of said sealing strip and said first and second longitudinal edge against said forming means.

12. A packaging machine as claimed in claim 1, wherein said forming means comprise a number of forming rollers.

13. A packaging machine for producing sealed packages of a food product from a web of packaging material, the web comprising a first and a second longitudinal edge opposite each other, the packaging machine comprising:

forming assemblies defining a compulsory passage for the web and configured to maintain the first and second longitudinal edge superimposed to form the packaging material into a tube, the forming assemblies being positioned to be located outside the tube; the first and second longitudinal edge defining, when superimposed, a surface of uneven thickness facing inwards of the tube; and at least one pressure roller positioned to be located inside the tube to press the surface of uneven thickness against one of the forming assemblies to form a longitudinal seal of the tube; wherein the pressure roller comprises:

a core possessing an outer surface facing radially outwardly and an inner surface facing radially inwardly and surrounding a hollow portion of the core, the inner surface of the core being positioned radially inwardly of the outer surface of the core;

a body made of elastically deformable material for pressing the sheet material, the body surrounding the outer surface of the core so that the outer surface of the core faces the body, the core being made of a more rigid material than the body; and the core comprising at least a first portion, a second portion and a third portion which are axially arranged and which each contact the body, the third portion being positioned axially between the first portion and the second portion, the radial distance between the inner surface of the core and the outer surface of the core at the first portion being greater than the radial distance between the inner surface of the core and the outer surface of the core at the second portion, the radial distance between the inner surface of the core and the outer surface of the core at the third portion varying along an axial extent of the third portion, the core comprising a first axial end face and a second axial end face positioned at opposite axial ends of the core, the first portion of the core extending from the first axial end face toward the third portion of the core, and the second portion of the core extending from the second axial end face toward the third portion of the core.

14. A packaging machine as claimed in claim 13, wherein the core is hollow throughout its length and is open at opposite axial ends of the core.

15. A packaging machine as claimed in claim 13, wherein the core possesses a central axis, and the inner surface of the core is spaced a constant distance from the axis.

16. A packaging machine as claimed in claim 13, wherein the first portion and the second portion are cylindrical.

17. A packaging machine for producing sealed packages of a food product from a web of packaging material, the web comprising a first and a second longitudinal edge opposite each other, the packaging machine comprising:

a plurality of forming rollers defining a compulsory passage for the web and arranged to maintain the first and second longitudinal edge superimposed to form the packaging material into a tube surrounding an interior, the forming rollers being positioned to be located outside the tube; the first and second longitudinal edge defining, when superimposed, a surface of uneven thickness facing towards the interior of the tube; and at least one pressure roller positioned to be located inside the tube to press the surface of uneven thickness against one of the forming rollers to form a longitudinal seal of the tube; wherein the pressure roller comprises:

a hollow core possessing an outer surface facing radially outwardly and an inner surface facing radially inwardly and surrounding an interior of the core, the core possessing axially spaced apart first and second ends;

a body of elastically deformable material for pressing the sheet material, the core being positioned inside the body so that the body surrounds the core and is in contact with the core, the core being made of a more rigid material than the body; and the core comprising a first axially extending portion contacted by the body, a second axially extending portion contacted by the body and a third axially extending portion contacted by the body, the third axially extending portion being positioned between the first axially extending portion and the third axially extending portion, the radial distance between the inner surface of the core and the outer surface of the core at the first axially extending portion contacted by the body being greater than the radial distance between the inner surface of the core and the outer surface of the core at the second axially extending portion contacted by the body, the radial distance between the inner surface of the core and the outer surface of the core at the third axially extending portion varying along an axial extent of the third axially extending third portion, the core comprising a first axial end face and a second axial end face positioned at opposite axial ends of the core, the first axially extending portion of the core extending from the first axial end face toward the third axially extending portion of the core, and the second axially extending portion of the core extending from the second axial end face toward the third axially extending portion of the core.

18. A packaging machine as claimed in claim 17, wherein the core possesses a central axis, and the inner surface of the core is spaced a constant distance from the axis.

* * * * *